Sept. 10, 1935.　　　S. SCHNETZER　　　2,014,090

WELDING REENFORCEMENT METHOD

Filed March 24, 1933　　2 Sheets-Sheet 1

INVENTOR
SIEGFRIED SCHNETZER.
BY
ATTORNEYS

Sept. 10, 1935.  S. SCHNETZER  2,014,090
WELDING REENFORCEMENT METHOD
Filed March 24, 1933  2 Sheets-Sheet 2

INVENTOR
SIEGFRIED SCHNETZER.
BY
ATTORNEYS

Patented Sept. 10, 1935

2,014,090

UNITED STATES PATENT OFFICE 2,014,090

WELDING REENFORCEMENT METHOD

Siegfried Schnetzer, Sparrows Point, Md., assignor, by mesne assignments, to North American Aviation, Inc., a corporation of Delaware Application March 24, 1933, Serial No. 662,569

11 Claims. (Cl. 219—10)

My invention relates to welding and, in particular, to that type of welding known as spot welding.

One object of my invention is to provide a reenforcing means and a method of reenforcement to give greater strength and resistance against tearing to spot-welded articles.

Another object is to provide a reenforcement by the use of which greater durability will be given to spot-welded joints.

Another object is to provide a reenforcement means and a method of reenforcement to enable the successful welding of thin sheets of metal either to other thin sheets or to thicker sheets, which otherwise would be imperfectly welded.

Another object is to provide a button piece adapted to reenforcing a spot weld of thin materials to other thin or thicker materials.

Another object is to provide a reenforcement in the form of a lentil with a scientifically evolved shape to create the maximum reenforcing power when it is pressed into the sheets to be spot welded.

Another object is to provide a lentil spot piece capable of being welded into and of becoming a part of a welded thin sheet and heavier sheet, and, at the same time, be so decreased in size as not to constitute an obstruction of the surface of the sheet.

Another object is to provide a method of reenforcing the spot weld of a relatively thin sheet to another relatively thin sheet or to a relatively heavy sheet by overlapping such sheets, superimposing a lentil spot button on the thin sheet, and subjecting the two sheets and button to pressure and flow of electrical energy.

Other objects and advantages will be understood from the following specification and claims taken in connection with the accompanying drawings.

Figure 1:
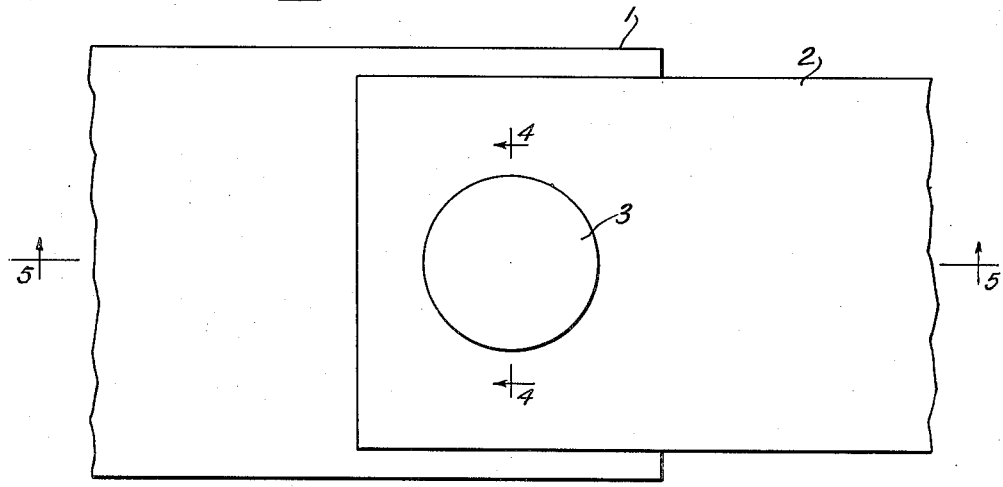
Figure 1 is a top plan view of a light metal sheet superimposed upon a heavier sheet, and a reenforcing button in position for welding.
Figure 2:
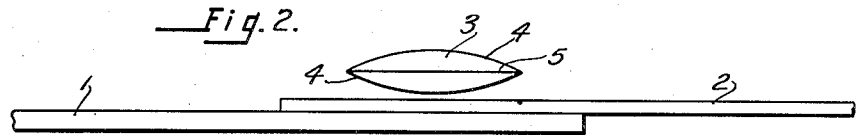
Figure 2 is a side elevation thereof.
Figure 3:
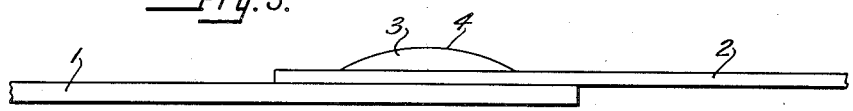
Figure 3 is a side elevation after welding.
Figure 4:
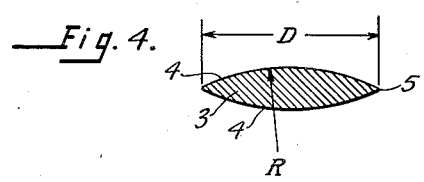
Figure 4 is a section on the line 4—4 of Figure 1 through the reenforcing button only.

Referring to the drawings in detail, 1 is a relatively heavy sheet of material on which is superimposed the lighter sheet 2 to be spot welded. Over the place which is to be welded is mounted a reenforcing button 3, the preferred form of which is known as a lentil spot, from its resemblance to a lentil. This reenforcing button becomes of valuable assistance in reenforcing the weld of sheets which would otherwise be too thin for structural safety, and is, therefore, exceedingly useful in airplane construction, where lightness with sufficient strength is a criterion of the utmost importance. It is very essential when utilizing spot welding in airplane construction to unite materials varying decidedly in thickness, that where the spot weld takes place the strength of the finished sheet should be reenforced so as to be sufficient to withstand service use.

Figure 5:
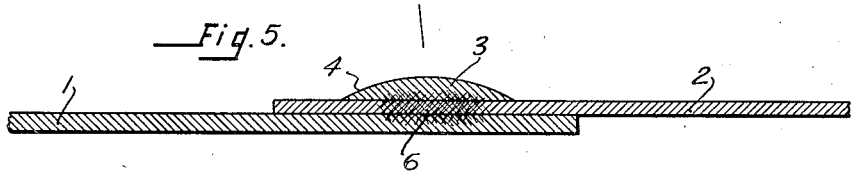
Figure 5 is a section on the line 5—5 of Figure 1 after welding.

It will be noted that this reenforcing member in the preferred form shown has upper and lower convex faces 4 and a marginal rim 5. Upon welding, the central lower part of the reenforcing button or spot member disappears into and becomes an integral part of the thin sheet and heavier sheet, whereas the marginal part between this welded spot 6 and the edge of the button remains unfused, as indicated in the double cross-hatched welded area shown diagrammatically at 6 in Figures 5 and 8 and the single cross-hatched unwelded area surrounding it. This occurs because, by the time the marginal part of the button has collapsed sufficiently to touch the sheet, the area of conduction contact has increased to such an extent that the heating effect has become reduced below the welding temperature, as will be apparent from Figure 5. The reenforcing button also decreases in thickness due to the pressure and the heat. Enough additional structural strength and, in particular, adequate bearing strength is thereby imparted to the welded joint to enable it to withstand service use.

The radius R of the convex surfaces 4 of the reenforcing button 3 is preferably approximately equal to the diameter D thereof, such proportions for the reenforcing button having been found substantially correct in practical experience with a weld of this character. In practice it has also been found that a suitable form is achieved when the diameter of the button is approximately ten times the thickness of the sheet to which the button is applied.

Figure 6:
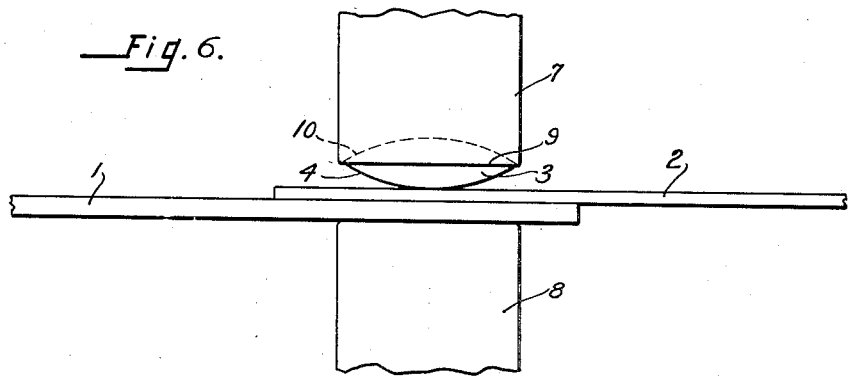
Figure 6 is a side elevation of a light metal sheet superimposed upon a heavier sheet before welding, with a reenforcing button in position, and the entire assembly held between a lower anvil member and an upper electrode member which also acts as a plunger.
Figure 7:
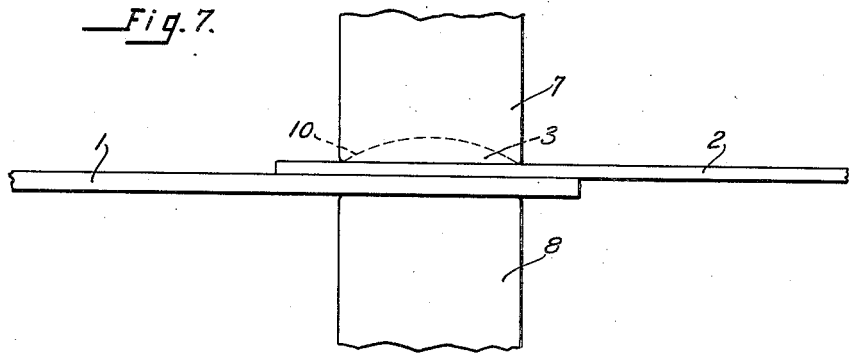
Figure 7 is a side elevation of the same parts as in Figure 6, but after welding has taken place.
Figure 8:
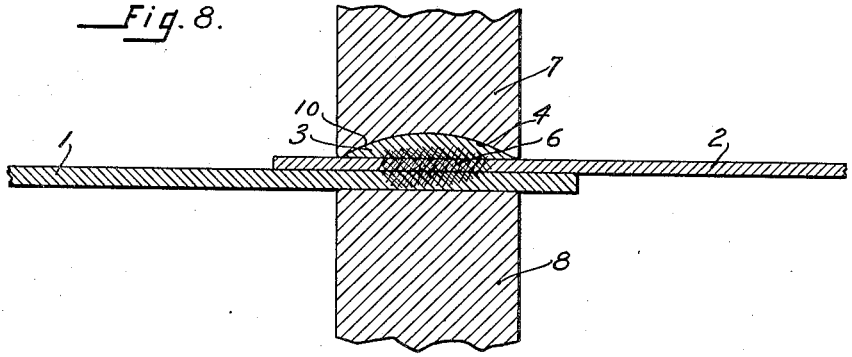
Figure 8 is a central vertical section through the parts shown in Figure 7.

The mode of procedure in utilizing this reenforcing button is shown diagrammatically in Figures 6, 7 and 8. The thin sheet 2 is shown placed in an overlapping position upon a thicker sheet 1, and both in turn are resting upon an anvil member 8. Superimposed upon the overlapping portion is a reenforcing button of the character described, it being in the lentil-shaped type preferred. The button in turn is beneath an electrode member 7 which also acts as a plunger and which has on its lower end 9 a configuration of the surface 10 corresponding to the configuration of the upper surface 4 of the reenforcing button, which it engages. Pressure is applied to the plunger member 7 and a flow of electrical energy is caused to pass between the members 7 and 8, traversing the reenforcing button 3 and the sheets 1 and 2 to be welded. The passage of the electrical energy creates heat through the resistance inherent in the materials, and this, combined with the mechanical pressure exerted by the plunger member 7, causes the plunger 7 to move downward, forcing the button 3 into the sheet 2 and causing it to become an integral part thereof. The relative positions of the parts after the weld has been completed are shown in Figure 7, and a cross-sectional view thereof in Figure 8.

Figure 9:
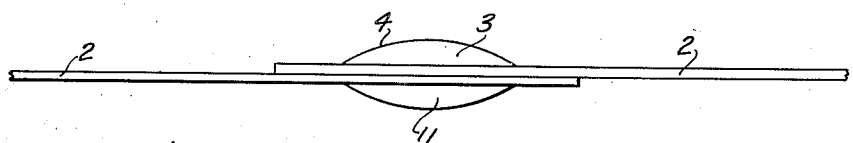
Figure 9 is a side elevation of two thin sheets of metal welded together and reenforced with the aid of a reenforcing button on each side of the joint.

In welding very thin sheets of materials to each other, as shown in Figure 9, the use of my reenforcing button will be found particularly valuable. In such application, however, two reenforcing buttons are preferably used, one on either side of the place where the spot weld is to be made. In this instance the anvil member 8 will likewise have an end configuration adapted to receive the lower reenforcing button 11, and the final appearance of the parts after the weld has been completed will be as shown in Figure 9.

It will be understood that the surfaces of the reenforcing button may have different radii of curvature, or one may be flat, or they may be given non-spherical surfaces, according to the nature of the materials to be welded or the particular conditions surrounding the work, without departing from the scope of my invention. It will also be seen that the making of the lower or contact surface convex causes a localization of the contact area for the passage of the electrical energy, so that the reenforcing button 3 will also perform the ordinary duties of an electrode tip. Furthermore, the final appearance of the exposed surface of the reenforcing button after welding will be substantially that of an ordinary rivet, and will offer the least obstruction and act as an obstacle to the minimum extent. The curved surfaces of the lentil spot member or button also provide the maximum contact area before or during welding, which serves to keep the electrode tips clean for an indefinite period.

It will be understood that I desire to comprehend within my invention such modifications as may be necessary to adapt it to varying conditions and uses.

Having thus fully described by invention, what I claim as new and desire to secure by Letters Patent is:

1. In a method of welding a relatively thin sheet to a relatively thick sheet by spot welding, overlapping said sheets, superimposing said sheets on an anvil, superimposing a reenforcing button with bulging upper and lower surfaces on the outer surface of the thin sheet where it overlaps the heavy sheet, applying a concave portion of an electrode to the upper convex portion of said button and applying a welding current through said reenforcing button and said sheets whereby to cause said button to collapse and become centrally welded to said sheet but to remain marginally unwelded by reason of the decrease of heat resulting from the increase of the contacting area through the collapse of the button.

2. In a method of welding a relatively thin sheet to a relatively thick sheet by spot welding, overlapping said sheets, superimposing said sheets on an anvil superimposing a lentil spot member on the thin sheet where it overlaps the heavy sheet, applying a concave portion of an electrode to the upper convex portion of said button, and applying a welding current through said lentil spot and said sheets.

3. In a method of welding a relatively thin sheet to a relatively thick sheet by spot welding, overlapping said sheets, superimposing said sheets on an anvil, superimposing a reenforcing button with bulging upper and lower surfaces on the outer surface of the thin sheet where it overlaps the heavy sheet, applying a concave portion of an electrode to the upper convex portion of said button, and simultaneously applying mechanical pressure over substantially the entire upper surface of the button and a welding current through said reenforcing button and said sheets whereby to cause said button to collapse and become centrally welded to said sheet but to remain marginally unwelded by reason of the decrease of heat resulting from the increase of the contacting area through the collapse of the button.

4. In a method of spot welding, overlapping a relatively thin and a relatively thick sheet, superimposing said sheets on an anvil superimposing on the outer surface of the thin sheet a reenforcing button with bulging upper and lower surfaces, applying a concave portion of an electrode to the upper convex portion of said button, subjecting the two sheets and button to mechanical pressure and welding current, and causing said button to collapse and gradually increase the area of contact between the button and the sheet while these are being welded together, thereby welding said sheets together.

5. In a method of spot welding, overlapping two relatively thin sheets, superimposing said sheets on an anvil, superimposing on the outer surface of each sheet a reenforcing button with bulging upper and lower surfaces, applying a concave portion of an electrode to the upper convex portion of said button, subjecting the two sheets and the two buttons to pressure and welding current, and thereby welding said sheets together.

6. In a method of welding providing a flat surfaced anvil, placing the overlapping portions of a plurality of sheets on said anvil, superimposing on said overlapping sheets a lentil button, applying the concave portions of an electrode member to one of the convex portions of the lentil button, and applying electric welding heat and pressure to said sheets and button until a portion of said button and said sheets have become welded together and said button assumes the outward appearance of a rivet without deforming the exterior surfaces of said sheets.

7. A welded construction embodying a plurality of overlapping sheets having a convex protuberance formed by a lentil-shaped button welded to the outside surface of at least one of said sheets with not more than shallow penetration into said sheet, said protuberance and sheets being held together by being welded to each other, said sheets having their exterior surfaces undeformed as welded.

8. A welded construction embodying a plurality of overlapping sheets having a convex protuberance formed by a lentil-shaped button welded to the outside surface of at least one of said sheets, said protuberance and sheets being held together by being welded to each other, said sheets having their exposed surfaces undeformed at the completion of the welding operation, the junction between the protuberance and the sheet being fused over but a part of the area thereof.

9. A method of welding two superimposed sheets of metal which consists in placing the sheets face-to-face in overlapping relationship, placing on the outer surface of one of the sheets a metallic button with bulging upper and lower surfaces, simultaneously applying pressure and an electric current to the button over a small conducting area, and by simultaneous fusion and pressure gradually increasing the conducting area, whereby to prevent substantial deformation of the sheets near the welded area.

10. A method of welding two superimposed sheets of metal which consists in placing the sheets face-to-face in overlapping relationship, placing on the outer surface of one of the sheets a metallic button with bulging upper and lower surfaces, applying an electric current to the button and the sheets over a small conducting area, whereby the button and the sheets are locally fused, and applying pressure to the button to gradually increase the conducting area, whereby to prevent substantial deformation of the sheets near the welded area.

11. A method of welding two superimposed sheets of metal which consists in placing the sheets face-to-face in overlapping relationship, placing on the outer surface of one of the sheets a metallic button with bulging upper and lower surfaces, applying an electric current to the button and the sheets over a small conducting area, whereby the button and the sheets are locally fused, and applying pressure to the button to deform it and thereby to gradually increase the conducting area, whereby to prevent substantial deformation of the sheets near the welded area.

SIEGFRIED SCHNETZER.